United States Patent [19]

Sugibuchi et al.

[11] Patent Number: 4,894,636

[45] Date of Patent: Jan. 16, 1990

[54] OIL LEAKAGE DETECTION DEVICE

[75] Inventors: Hiroyuki Sugibuchi; Juji Akiba, both of Saitama, Japan

[73] Assignee: Junkosha Co., Ltd., Japan

[21] Appl. No.: 260,497

[22] Filed: Oct. 21, 1988

[30] Foreign Application Priority Data

Jan. 28, 1988 [JP] Japan .............................. 63-9909[U]

[51] Int. Cl.⁴ ............................................. H01C 7/06
[52] U.S. Cl. ......................................... 338/9; 338/28; 338/22 R
[58] Field of Search ................ 338/7, 9, 22 R, 225 D, 338/28, 320; 374/4, 5

[56] References Cited

U.S. PATENT DOCUMENTS 3,765,240 10/1973 Haus, Jr. ............................ 374/5 X
3,970,983 7/1976 Hayasaka ................................ 338/9

Primary Examiner—C. L. Albritton
Attorney, Agent, or Firm—Mortenson & Uebler

[57] ABSTRACT

An oil leakage detection device is provided having a detection unit comprising: (a) an oil leakage detecting sensor which exhibits a positive resistance-temperature characteristic in response to changes in temperature, connected, in series, to (b) an oil leakage detecting sensor which exhibits a negative resistance-temperature characteristic in response to changes in temperature.

1 Claim, 1 Drawing Sheet

OIL LEAKAGE DETECTION DEVICE

BACKGROUND OF THE INVENTION

The present invention concerns a detection device which detects the leakage of oil.

Conventional detection devices for detecting the leakage of oil have been designed as follows: a detection sensor which is covered by a continuously porous polytetrafluoroethylene resin, which may be impregnated with powdered carbon, a conductive substance, so that two oil leakage sensing conductors such as copper wires are maintained at a fixed distance from each other is installed in a location where oil leakage is to be detected. When leaking oil penetrates this detection sensor so that the leaking oil is present between the two aforementioned oil leakage sensing conductors, the electrical resistance between the conductors increases, which resistance change can be measured, indicated that the oil leakage has occurred.

However, in the case of conventional oil leakage detection devices of the abovementioned type, the resistance-temperature coefficient of the continuously porous polytetrafluoroethylene resin impregnated with powdered carbon, which is used in the detection part, changes with a change in temperature. As a result, the electrical resistance between the oil leakage sensing conductors covered by this continuously porous polytetrafluoroethylene resin also changes with a change in temperature. Furthermore, the manner of this change is not always the same. For example, there are resins in which the resistance-temperature coefficient rises with a rise in temperature (as indicated by the dashed line in FIG. 2), and resins in which the resistance-temperature coefficient drops with a rise in temperature (as indicated by the dashed-dotted line FIG. 2).

Accordingly, in cases where such a detection sensor is installed in a location such as a drainage channel, where there are fluctuations in the water level, the degree of immersion of the detection sensor in the water varies with the fluctuation of the water level, so that there are abrupt variations in the temperature of the detection sensor. As a result, the electrical resistance between the two oil leakage sensing conductors changes as a result of the change in temperature even in the absence of any leakage of oil. Accordingly, the leakage of oil often cannot be accurately ascertained. Heretofore, this has been a problem in such conventional devices.

The present invention was designed in the light of such problems encountered in the prior art. The object of the present invention is to provide an oil leakage detection device whose detection characteristics are substantially unaffected by changes in temperature.

SUMMARY OF THE INVENTION

Oil leakage detection apparatus is provided having a detection unit comprising an oil leakage detecting sensor which exhibits a positive resistance-temperature characteristic in response to changes in temperature, connected, in series, to an oil leakage detecting sensor which exhibits a negative resistance-temperature characteristic in response to changes in temperature.

DETAILED DESCRIPTION OF THE DRAWINGS AND PREFERRED EMBODIMENTS WITH REFERENCE TO THE DRAWINGS

An oil leakage detection device is provided having a detection unit comprising: (a) an oil leakage detecting sensor which exhibits a positive resistance-temperature characteristic in response to changes in temperature, connected, in series, to (b) an oil leakage detecting sensor which exhibits a negative resistance-temperature characteristic in response to changes in temperature.

More specifically, the oil leakage detection device of the present invention is equipped with a detection unit in which (a) an oil leakage detecting sensor which shows a positive resistance-temperature characteristic in response to changes in temperature, and (b) an oil leakage detecting sensor which shows a negative resistance-temperature characteristic in response to changes in temperature, are connected in series.

The detection unit of the oil leakage detection device of the present invention comprises a unit in which (a) an oil leakage detecting sensor which shows a positive resistance-temperature characteristic in response to changes in temperature, and (b) an oil leakage detecting sensor which shows a negative resistance-temperature characteristic in response to changes in temperature, are connected in series. Accordingly, even if the electrical resistance values of the respective oil leakage detecting sensors should change as a result of a change in temperature, these changes in the electrical resistance values of the respective detecting sensors cancel each other, so that the effect of temperature changes on the detection characteristics is eliminated. Thus, only changes in resistance which are caused by leaking oil are detected.

Below, one example of application of the present invention is described with reference to the accompanying drawings.

Figure 1:
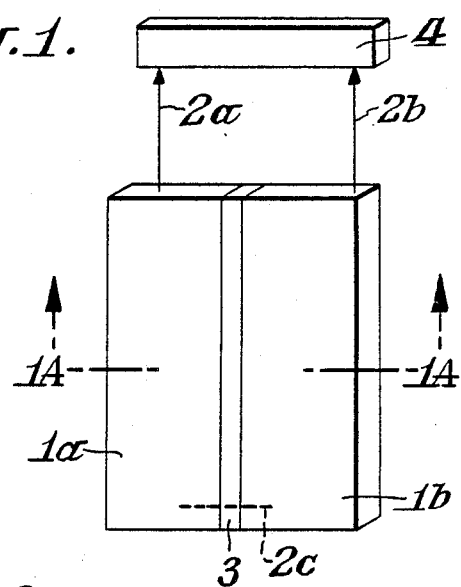
FIG. 1 is a schematic view illustrating one embodiment of the invention.

As is shown in FIG. 1, the oil leakage detection device of the present invention has a detection unit which comprises left and right oil leakage detecting sensors 1a, 1b. These oil leakage detecting sensors 1a, 1b are connected to an oil leakage detector 4, such as a resistance meter, by respective wires 2a, 2b. Furthermore, the lower ends of the oil leakage detecting sensors 1a, 1b are electrically connected to each other in series by conductor 2c. An insulator 3, such as unfilled, porous, expanded polytetrafluoroethylene, is installed between the oil leakage detecting sensors 1a, 1b, so that the conduction of electricity between the sensors by any means other than the aforementioned conductor 2c is prevented.

Figure 1A:
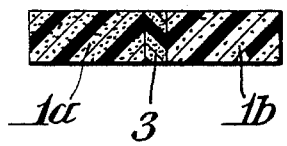
FIG. 1A is a cross-sectional view taken along line 1A—1A of FIG. 1.

FIG. 1A is a cross-sectional view of sensors 1a and 1b taken along line 1A—1A of FIG. 1.

Figure 2:
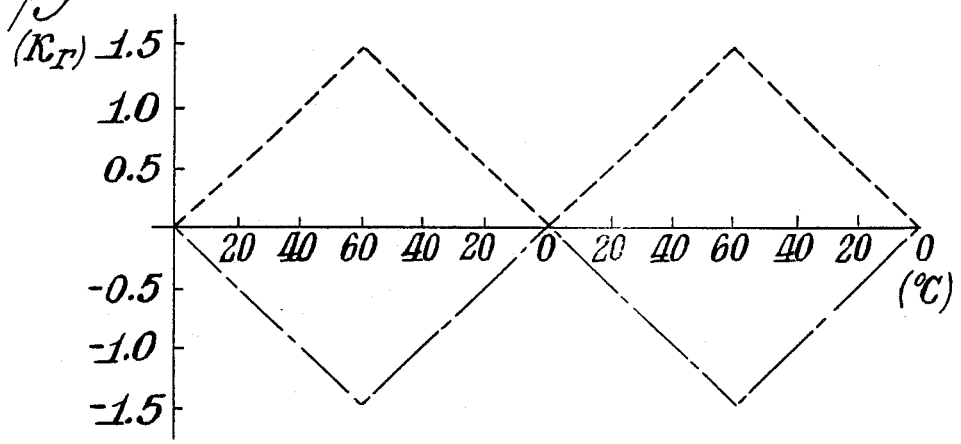
FIG. 2 is a graphical illustration of the changes in the resistance-temperature coefficients of the oil leakage detecting sensors as a result of changes in temperature.
Figure 3:
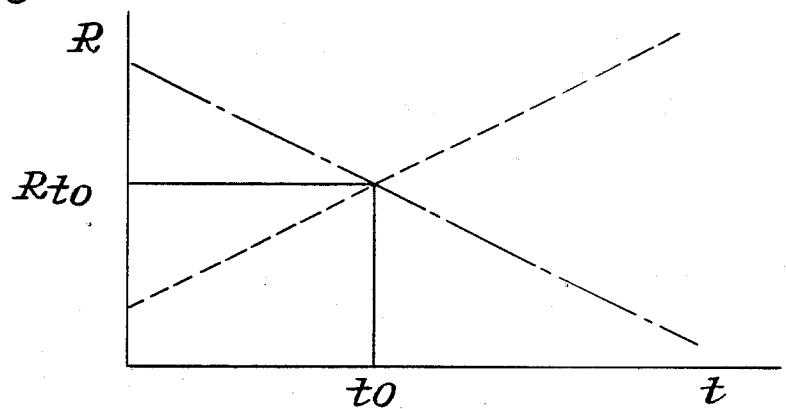
FIG. 3 is a graphical illustration of the changes in the resistance values of the oil leakage detecting sensors as a result of changes in temperature.

The aforementioned left and right oil leakage detecting sensors 1a, 1b are formed by filling a continuously porous polytetrafluoroethylene resin with a conductive substance such as carbon powder. The left oil leakage detecting sensor 1a has a larger quantity of conductive substance, for example, 20 weight percent of a low mesh carbon powder, and is therefore set so that the contacts between the conductive substance will decrease as a result of the expansion of the resin as temperature rises, and resistance-temperature coefficient of this sensor rises with a rise in temperature, as indicated by the dashed line in FIG. 2. On the other hand, the right oil leakage sensor 1b has a smaller quantity of conductive substance, such as 12 weight percent of high mesh graphite powder and is therefore set so that the substances make chain contact with swelling of resin, and the resistance-temperature coefficient of this sensor drops with a rise in temperature, as indicated by the dashed-dotted line in FIG. 2. The rate of the rise in the resistance-temperature coefficient of the left oil leakage sensor 1a accompanying a rise in temperature and the rate of the drop in the resistance-temperature coefficient of the right oil leakage detecting sensor 1b accompanying a rise in temperature are substantially equal, as are the rate of the drop in the resistance-temperature coefficient of the left oil leakage detecting sensor 1a accompanying a drop in temperature and the rate of the rise in the resistance-temperature coefficient of the right oil leakage detecting sensor 1b accompanying a drop in temperature. As shown in FIG. 3, these left and right oil leakage detecting sensors 1a, 1b are set so that their respective values $R_{t0}$ at temperature $t_o$ are equal. Accordingly, at various temperatures, the difference between the resistance value of the oil leakage detecting sensor 1a and the resistance value $R_{to}$ at temperature $t_o$ is equal to the difference between the resistance value $R_{to}$ at temperature $t_o$ and the resistance value of the oil leakage detecting sensor 1b, at the same temperature. Furthermore, since these left and right oil leakage detecting sensors 1a, 1b are connected in series, the combined resistance of the two sensors is detemined by the sum of the respective resistance. Accordingly, the combined resistance of the two sensors will always be $2R_{to}$.

The method of use and action of the oil leakage detection device of the present invention will now be described.

In using the oil leakage detection device of the present invention, the lengths of the detecting sensors 1a, 1b are selected so that they are roughly equal to the depth of the drainage channel where oil leakage is to be detected. The detection device is then installed along the wall, or other suitable location, of the drainage channel at a location where it is suspected that oil leakage might occur. As a result, leaking oil will reliably reach the oil leakage detecting sensors 1a, 1b regardless of the water level in the drainage channel. Furthermore, the respective oil leakage detecting sensors 1a, 1b will have substantially equal contact areas with respect to the leaking liquid.

When leaking oil arrives under these conditions, the leaking oil penetrates the oil leakage detecting sensors 1a, 1b consisting of the aforementioned continuously porous polytetrafluoroethylene resin, so that leaking oil is present between the conductors 2a and 2c, and between the conductors 2b and 2c. As a result, the electrical resistance value is increased.

This rise in the electrical resistance value is detected by the oil leakage detector 4, such as a resistance meter, which is connected with the wires 2a, 2b. The oil leakage detector 4 thus determines that a condition of oil leakage exists, and issues an alarm for example, by a visually observable means such as a flashing lamp.

When the water level in the drainage channel rises so that the degree of immersion of the detection unit in the water is increased, the temperature of the detecting sensors 1a, 1b rises. As a result, even though there is no oil leakage, the resistance value of the left oil leakage detecting sensor 1a increases with the rise in temperature as indicated by the dashed line in FIG. 3, while the resistance value of the right oil leakage detecting sensor 1b drops with the rise in temperature as indicated by the dashed-dotted line in FIG. 3. However, as described above, the combined resistance value of the left and right oil leakage detecting sensors 1a, 1b, which are connected to each other in series, constantly remains at $2R_{to}$ regardless of any change in temperature. Accordingly, the effect of changes in temperature on the change in the resistance of the detection unit is eliminated, so that oil leakage can be accurately detected.

In cases where the water level in the drainage channel drops so that the temperature of the detection unit decreases, the combined resistance of the oil leakage detecting sensors 1a, 1b similarly remains at a constant value ($2R_{to}$), so that oil leakage can be accurately detected.

In this example, the lower parts of the oil detecting sensors 1a, 1b are aligned, and the detecting sensors are installed so that they have equal contact surface areas with respect to the leaking liquid. Accordingly, even when the water level in the drainage channel changes, no situation arises in which the resistance value of only one of the oil leakage detecting sensors 1a, 1b changes. Thus, oil leakage can be detected more accurately.

Moreover, in the above example, the oil leakage detecting sensors 1a, 1b are installed so that they are insulated from each other by means of insulator 3. It would also be possible to install these oil leakage detecting sensors 1a, 1b so that they are widely separated from each other, and electrically connected. Alternatively, it would be possible to form the two detecting sensors from a thin tape-form material, and to paste the two sensors together. In such cases, the system should be arranged so that the heights of the lowermost parts of the two oil leakage detecting sensors 1a, 1b are equal, so that the contact surface areas of these sensors with respect to the leaking liquid are substantially equal.

In the above example, a continuously porous polytetrafluoroethylene resin filled with conductive substances was used for the aforementioned oil leakage detecting sensors 1a, 1b. However, the present invention is not limited to this material. Other porous materials may also be used, such as porous polyurethane.

As was described above, the oil leakage detection device of the present invention makes it possible to eliminate the effect of changes in temperature on the detection characteristics of the detection device. Accordingly, the leakage of oil can be accurately detected even in locations where temperature conditions are unstable. In order to obtain this result, the series connection of (a) an oil leakage detecting sensor which shows a positive resistance-temperature characteristic in response to changes in temperature, and (b) an oil leakage detecting sensor which shows a negative resistance-temperature characteristic in response to changes in temperature is required. Thus, this device can be produced easily and inexpensively.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. Oil leakage detection apparatus having a detection unit comprising: (a) an oil leakage detecting sensor which exhibits a positive resistance-temperature characteristic in response to changes in temperature, connected, in series, to (b) an oil leakage detecting sensor which exhibits a negative resistance-temperature characteristic in response to changes in temperature.

* * * * *